US012646326B2

(12) United States Patent
Perras et al.

(10) Patent No.: US 12,646,326 B2
(45) Date of Patent: Jun. 2, 2026

(54) OCCUPANCY DETERMINATION METHOD AND SYSTEM

(71) Applicant: Siemens Aktiengesellschaft, Munich (DE)

(72) Inventors: Stefan Perras, Eichenau (DE); Josep Soler Garrido, Sevilla (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 326 days.

(21) Appl. No.: 18/250,604

(22) PCT Filed: Oct. 14, 2021

(86) PCT No.: PCT/EP2021/078481
§ 371 (c)(1),
(2) Date: Apr. 26, 2023

(87) PCT Pub. No.: WO2022/089550
PCT Pub. Date: May 5, 2022

(65) Prior Publication Data
US 2023/0401863 A1 Dec. 14, 2023

(30) Foreign Application Priority Data
Oct. 30, 2020 (EP) .................................... 20204877

(51) Int. Cl.
| *G06K 9/00* | (2022.01) |
| *G06T 7/20* | (2017.01) |
| *G06V 10/762* | (2022.01) |
| *G06V 20/52* | (2022.01) |

(52) U.S. Cl.
CPC ................ *G06V 20/52* (2022.01); *G06T 7/20* (2013.01); *G06V 10/7625* (2022.01)

(58) Field of Classification Search
None
See application file for complete search history.

(56) References Cited

U.S. PATENT DOCUMENTS

| 2013/0258107 A1 | 10/2013 | Delibaltov | .................... 348/148 |
| 2017/0256165 A1 | 9/2017 | Pennington | ............ G08G 1/147 |
| 2018/0301031 A1 | 10/2018 | Naamani | .................. G08G 1/14 |
| 2020/0302161 A1 | 9/2020 | Sriram | ...................... G06K 9/00 |
| 2022/0092979 A1* | 3/2022 | Gambella | .......... G01C 21/3685 |

FOREIGN PATENT DOCUMENTS

WO WO-2016174670 A1 * 11/2016 ......... G01C 21/3682

OTHER PUBLICATIONS

Search Report for International Application No. PCT/EP2021/078481, 11 pages, Feb. 8, 2022.

* cited by examiner

*Primary Examiner* — Wei Wen Yang
(74) *Attorney, Agent, or Firm* — Slayden Grubert Beard PLLC

(57) ABSTRACT

Various embodiments include a method for determination of an actual occupancy distribution of parking spots of a parking area. The method may include: processing an actual image of the parking area to detect one or more vehicles in the actual image, resulting in an actual vehicle representation; and processing the actual vehicle representation and an earlier generated general layout of the parking area to determine the actual occupancy distribution.

11 Claims, 4 Drawing Sheets

OCCUPANCY DETERMINATION METHOD AND SYSTEM

CROSS-REFERENCE TO RELATED APPLICATIONS

This application is a U.S. National Stage Application of International Application No. PCT/EP2021/078481 filed Oct. 14, 2021, which designates the United States of America, and claims priority to EP Application No. 20204877.3 filed Oct. 30, 2020, the contents of which are hereby incorporated by reference in their entirety.

TECHNICAL FIELD

The present disclosure relates to occupancy determination of parking spots in a parking area.

BACKGROUND

Charging stations for charging batteries of vehicles with electric drive systems or "electric vehicles", respectively, are continuously integrated into modern traffic infrastructure but still suffer under relatively low utilization rate. This can be explained, at least to some extent, by the fact that combustion engine vehicles are violating parking spots in front of such charging stations which are reserved for electric vehicles during charging. Moreover, electric cars are blocking the charging station and parking spot, respectively, although the charging service might already be finished or has not even been utilized. As a further drawback for an electric vehicle user, typical mobile apps provided by a charging station operator do not show reliable information about the status of a charging station, i.e. whether a particular station is currently not used for charging and, at the same time, the parking spot corresponding to the particular charging station is not occupied.

Retrofit solutions based on radar, magnetic, ultrasound, or similar technologies are available. However, on the one hand such solutions still do not offer the required reliability for the electric vehicle user and on the other hand the installation of such a technology and the adaption to the local conditions of the parking area to be equipped is quite elaborate.

SUMMARY

Therefore, the present disclosure describes systems and/or methods for reliable occupancy determination of parking spots of a parking area is required. For example, some embodiments of the teachings herein include an occupancy determination method ODM for determination of an actual occupancy distribution OD_act of one or more parking spots of a parking area, comprising: a vehicle detection step VDS of processing an actual image IMA of the parking area 100 to detect one or more vehicles in the actual image IMA, resulting in an actual vehicle representation VRep, an occupancy determination step ODS of processing the actual vehicle representation VRep and an earlier generated general layout GLPA of the parking area 100 to determine the actual occupancy distribution OD_act.

In some embodiments, the occupancy determination step ODS utilizes a probabilistic model PBM to process the actual vehicle representation VRep and the general layout GLPA of the parking area 100 to determine the actual occupancy distribution OD_act.

In some embodiments, the probabilistic model's PBM working principle to determine the current occupancy distribution OD_act is based on a comparison of the actual vehicle representation VRep with all possible occupancy distributions OD(k) of the parking area according to the general layout GLPA of the parking area 100, wherein the model PBM processes the actual vehicle representation VRep to calculate a likelihood P_tot(k) for each one of the possible occupancy distributions OD(k) with k=1, . . . , 2^J and J being the number of parking spots of the parking area, a respective likelihood P_tot(k) expressing to which extent the respective occupancy distribution OD(k) matches with the actual vehicle distribution VRep.

In some embodiments, the occupancy distribution OD(k') with the highest likelihood is selected to be the actual occupancy distribution OD_act=OD(M).

In some embodiments, the probabilistic model's PBM working principle to determine the current occupancy distribution OD_act is based on a calculation of an occupation likelihood P_j for each individual parking spot of interest according to the general layout GLPA of the parking area 100, with j=1, . . . , J and with J representing the number of parking spots according to the general layout GLPA, wherein a probabilistic estimation based on the actual vehicle representation VRep and the general layout GLPA is conducted for each such parking spot of interest, such estimation resulting in likelihoods P_j that such respective parking spot of interest j is occupied by a vehicle, wherein the actual occupancy distribution OD_act is represented by the likelihoods P 1, . . . , P_J.

In some embodiments, the method includes determination of the general layout GLPA of the parking area 100, wherein a plurality of earlier vehicle representations VRep(c) with c=1, 2, . . . , which have been determined in the past, is processed in a spot clustering step SCS to generate the general layout GLPA of the parking area 100.

In some embodiments, the spot clustering step SCS applies a hierarchical clustering process on the plurality of earlier vehicle representations VRep(c), e.g., implemented in an unsupervised machine learning approach.

In some embodiments, the general layout GLPA of the parking area 100 is determined by combining the plurality of earlier vehicle representations VRep(c) to produce a heatmap REP_PS representing the general layout GLPA of the parking area 100, such that the heatmap REP_PS comprises first sections representing areas of the parking area 100 where vehicles have been parked in at least some of the captured images IMA(c) and second sections corresponding to areas where no or only rarely vehicles have been parked, wherein the first sections allow for a conclusion on the number and position of parking spots in the parking area.

In some embodiments, the determination of all possible occupancy distributions OD(k) is performed based on the identification of the first sections of the heatmap REP_PS.

In some embodiments, a change mask M_subb produced in a background subtraction step BS applied with the image IMA is utilized in the occupancy determination step ODS, wherein M_subb corresponds to a difference image between the actual image IMA and a background image IMA_B, wherein the background image IMA_B shows the parking area with free parking spots, wherein the occupancy determination step ODS processes a combination of the actual vehicle representation VRep and the change mask M_subb.

As another example, some embodiments include a system (300) for determination of an actual occupancy distribution OD_act of one or more parking spots (1-8) of a parking area (100), comprising a camera (301) with a field of view FOV for capturing images IMA of the parking area (100), comprising at least representations of the parking spots (1-8), and a processor (302) configured to execute one or more of the methods described herein.

In some embodiments, the system further comprises a memory (303), wherein the camera (301) is configured to capture a plurality of images IMA over time, the processor (302) is configured to determine an actual vehicle representation VRep for each image IMA of the plurality of images, wherein the vehicle representations VRep are stored in the memory (303), the processor (302) is further configured to process at least a subset of the determined vehicle representations stored in the memory (303) in a spot clustering step to determine the general layout GLPA of the parking area 100.

In some embodiments, the system is configured to determine an updated general layout GLPA of the parking area 100 after a given number of images has been captured.

In some embodiments, the system further comprises a motion sensor (304) for the detection of motion in the field of view FOV of the camera (301), wherein the system (300) is configured such that one or more of the methods described herein is only executed in case the motion sensor (304) detects a significant motion in the field of view.

As another example, some embodiments include a method for determining a general layout GLPA of a parking area (100) comprising at least one parking spot (1-8), wherein a plurality of vehicle representations VRep(c) with $c=1,2,3, \ldots$ is provided, wherein different vehicle representations VRep(c1), VRep(c2) with $c1 \neq c2$ of the plurality of vehicle representations VRep(c) have been determined in corresponding vehicle detection steps VDS from different images IMA(c1), IMA(c2) of the parking area, wherein such different images IMA(c1), IMA(c2) show the parking area at different points in time, the vehicle representations VRep(c) are processed in a spot clustering step SCS to determine the general layout GLPA of the parking area (100), wherein the spot clustering step SCS applies a hierarchical clustering process on the plurality of vehicle representations VRep(c), preferably implemented in an unsupervised machine learning approach.

BRIEF DESCRIPTION OF THE DRAWINGS

In the following, possible embodiments of the different aspects of the present teachings are described in more detail with reference to the enclosed figures. The objects as well as further advantages of the example embodiments will become more apparent and readily appreciated from the following description of the preferred embodiments, taken in conjunction with the accompanying figure in which.

DETAILED DESCRIPTION

Figure 1:
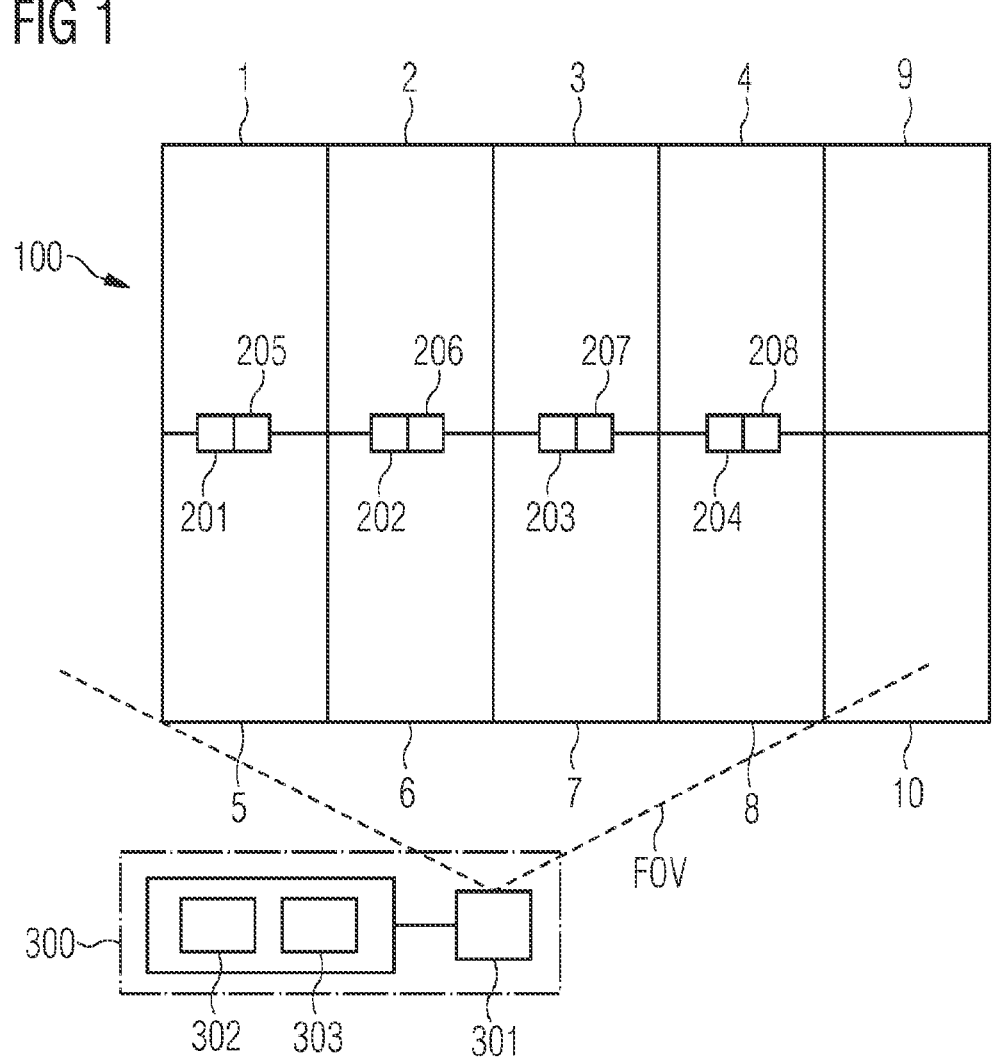
FIG. 1 shows a top view of a parking area.

In the present disclosure, a "charging station" is an installation for charging one electric vehicle at a time. Typically, a parking area comprising a plurality of parking spots might be equipped with a plurality of charging stations. One charging station would then be arranged to supply an electric vehicle located on one of the parking spots with electric energy. Of course, two or even more charging stations might be accommodated in one common housing, but still each one of the charging stations is established to charge one electric vehicle at a time.

In some embodiments, an occupancy determination method ODM for determination of an actual occupancy distribution OD_act of one or more parking spots of a parking area, comprises a vehicle detection step VDS of processing an actual image IMA of the parking area, which has just been captured, to detect one or more vehicles in the actual image IMA, resulting in an actual vehicle representation VRep. The representation VRep can be, for example, a mask or a bounding box arrangement representing the vehicles depicted in the actual image IMA. Furthermore, the method comprises an occupancy determination step ODS of processing the actual vehicle representation VRep and an earlier generated general layout GLPA of the parking area to determine the actual occupancy distribution OD_act. The actual image IMA captured by a camera with a suitable field of view FOV of the parking area comprises at least representations of the parking spots.

In the vehicle detection step VDS, one or more regions in the actual image IMA are identified which represent correspondingly one or more vehicles parked in the parking area, such regions can be, as mentioned above, characterized by a bounding box arrangement and/or a mask, such identified one or more regions forming the actual vehicle representation VRep. The occupancy determination step ODS utilizes a probabilistic model PBM to process the actual vehicle representation VRep and the general layout GLPA of the parking area to determine the actual occupancy distribution OD_act.

The probabilistic model's PBM working principle to determine the current occupancy distribution OD_act is, in a first variant, based on a comparison of the actual vehicle representation VRep with all possible occupancy distributions OD(k) of the parking area according to the general layout GLPA of the parking area. The model PBM processes the actual vehicle representation VRep to calculate a likelihood P_tot(k) for each one of the possible occupancy distributions OD(k) with $k=1, \ldots, 2^{\wedge}J$ and J being the number of parking spots of the parking area, a respective likelihood P_tot(k) expressing to which extent the respective occupancy distribution OD(k) corresponds to or matches with the actual vehicle distribution VRep. Thus, different combinations of possible occupancies and different occupancy distributions OD(k), respectively, are assigned different likelihoods P_tot(k) by the model PBM. Therein, the occupancy distribution OD(k') with the highest likelihood is selected to be the actual occupancy distribution OD_act=OD (M).

In some embodiments, the probabilistic model's PBM working principle to determine the current occupancy distribution OD_act is based on a calculation of an occupation likelihood P_j for each individual parking spot of interest according to the general layout GLPA of the parking area 100, with $j=1, \ldots, J$ and with J representing the number of parking spots according to the general layout GLPA. A probabilistic estimation based on the actual vehicle representation VRep and the general layout GLPA is conducted for each such parking spot of interest according to the layout GLPA, such estimation resulting in likelihoods P_j that such respective parking spot of interest j is occupied by a vehicle, wherein the actual occupancy distribution OD_act is represented by the likelihoods P_1, . . . , P_J. In contrast to this, the first variant calculates the likelihood that a complete occupancy distribution OD(k) matches with the input VRep received from the first network ANN1.

In some embodiments, the method may comprise determination of the general layout GLPA of the parking area, wherein a plurality of earlier vehicle representations VRep (c) with c=1, 2, . . . , which have been determined in the past, i.e. at some point in time before the actual vehicle representation VRep, and which may show different occupancies of the parking area, is processed in a spot clustering step SCS to generate the general layout GLPA of the parking area 100. Each execution of the occupancy determination method ODM results in an actual vehicle representation VRep. Thus, a plurality of such vehicle representations VRep would be generated over time. Those "earlier" created representations are the basis for determination of the general layout GLPA of the parking area.

The spot clustering step SCS applies a hierarchical clustering process on the plurality of earlier vehicle representations VRep(c), which may be implemented in an unsupervised machine learning approach. The general layout GLPA of the parking area can be determined by combining the plurality of earlier vehicle representations VRep(c) to produce a heatmap REP_PS representing the general layout GLPA of the parking area, e.g. by overlaying or adding the earlier vehicle representations VRep(c), respectively. Thus, the heatmap REP_PS comprises first sections representing areas of the parking area where vehicles have been parked in at least some of the captured images IMA(c) and second sections corresponding to areas where no or only rarely vehicles have been parked. I.e. the heatmap shows the areas representing the parking spots of the parking area in the images IMA, wherein the first sections allow for a conclusion on the number and position of parking spots in the parking area.

The determination of all possible occupancy distributions OD(k) can be performed based on the identification of the first sections of the heatmap REP_PS. Furthermore, a change mask M_subb produced in a background subtraction step BS applied with the image IMA can be utilized in the occupancy determination step ODS, wherein M_subb corresponds to a difference image between the actual image IMA and a background image IMA_B, wherein the background image IMA_B shows the parking area with free parking spots, wherein the occupancy determination step ODS processes a combination of the actual vehicle representation VRep and the change mask M_subb instead of the vehicle representation alone.

A System for determination of an actual occupancy distribution OD_act of one or more parking spots of a parking area, com-comprises a camera with a field of view FOV for capturing images IMA of the parking area, comprising at least representations of the parking spots, as well as a control system with a processor configured to execute one or more of the methods described herein.

In some embodiments, the system comprises a memory, wherein the camera is configured to capture a plurality of images IMA over time and the processor is configured to determine an actual vehicle rep-resentation VRep for each image IMA of the plurality of images, wherein the vehicle representations VRep are stored in the memory. The processor is further configured to process at least a subset of the determined vehicle representations stored in the memory in the spot clustering step to determine the general lay-out GLPA of the parking area. The system might be configured to determine an updated general layout GLPA of the parking area after a given number of images has been captured.

In some embodiments, the system comprises a motion sensor for the detection of motion in the field of view FOV of the camera, wherein the system is configured such that the method described above is only executed in case the motion sensor detects a significant motion in the field of view.

Some embodiments include a method for automatic determination of a general layout GLPA of a parking area comprising at least one parking spot. In a first step, a plurality of vehicle representations VRep(c) with c=1,2,3, . . . is provided, wherein different vehicle representations VRep(c1), VRep(c2) with c1≠c2 of the plurality of vehicle representations VRep(c) have been determined in corresponding vehicle detection steps VDS from different images IMA(c1), IMA(c2) of the parking area, wherein such different images IMA(c1), IMA(c2) show or represent, respectively, the parking area at different points in time, i.e. different images have been captured at such different points in time, therewith typically showing different occupancy distributions.

In a second step, the vehicle representations VRep(c) are processed in a spot clustering step SCS to determine the general layout GLPA of the parking area, wherein the spot clustering step SCS applies a hierarchical clustering process on the plurality of vehicle representations VRep(c), preferably implemented in an un-supervised machine learning approach. Therein, as mentioned earlier, the general layout GLPA of the parking area can be determined by combining, e.g. by overlaying, the plurality of vehicle representations VRep(c) to produce a heatmap REP_PS representing the general layout GLPA of the parking area, such that the heatmap REP_PS comprises first sections representing areas of the parking area where vehicles have been parked in at least some of the captured images IMA(c) and second sections corresponding to areas where no or only rarely vehicles have been parked, wherein the first sections allow for a conclusion on the number and position of parking spots in the parking area.

The teachings herein include an unsupervised learning method, which may be applied in the background subtraction step, running directly on local computing units and data stored locally on the charging station. This allows the system to analyze the visual field of the camera over long periods of time to autonomously analyze a parking area to detect its parking spots, to determine their occupancy status, and to adapt to changes in the occupancy patterns or position of the sensor.

In some embodiments, there is an edge device and a camera that is integrated in a charging station. It continuously monitors the parking spot(s) in front of the charging station, analyzes the status, which can be, for example, "free" or "occupied", and sends such current status to the charging station itself which then forwards the status information to the operator of the charging station. The operator can provide the information to be displayed on a respective charging app.

In some embodiments, the teachings herein can be implemented as an integrated low-cost solution that works with a standard camera module and applies comprehensive artificial intelligence algorithms to detect whether a parking spot is free or occupied. It does not require connectivity to a backend in the cloud to store and/or process data or images. This turns out to be a remarkable advantage since such data or images might contain personal and private information and the independence from such cloud services allows to guarantee data privacy and compliance with data privacy regulation, respectively.

As a further advantage, the systems and methods may require only reduced installation and maintenance efforts as it does not require initial calibration e.g. for indicating locations of parking spots on the camera's visual field. The methods may be able to adapt and correct deviations due to unexpected movements of the camera, changed layout of the parking spots, or other rearrangements.

In some embodiments, the system can be installed at a parking area without being configured or tailored for that particular parking area. In contrast, the preparation described below includes an automatic configuration of the system, especially with regard to the determination of the number of parking spots, based on the heatmap introduced below.

FIG. 1 shows a top view on an exemplary parking area 100 with, for example, eight parking spots 1-8 for electric vehicles and, for example, two parking spots 9, 10 for combustion engine vehicles. A charging system 200 for charging batteries of electric vehicles parked on the parking spots 1-8 of the parking area 100 includes, in the scenario shown in FIG. 1, eight charging stations 201-208 corresponding to the eight parking spots 1-8 for electric vehicles. The additional parking spots 9, 10 are not equipped with charging stations. Of course, this embodiment of the parking area 100 is only exemplary and there might be more or fewer parking spots and charging stations might be foreseen for each parking spot or not. Moreover, it might be possible that two or more of the charging stations 201-208 are located in a common housing. However, FIG. 1 shows a dedicated charging station 201-208 for each parking spot 1-8.

The parking area control system 300 comprises a camera 301 which is arranged and embodied such that each one of the parking spots 1-8 for electric vehicles, in the following "parking spot of interest" where applicable, is located in the field of view FOV of the camera 301. The additional parking spots 9, 10 of the parking area 100 can be, but don't have to be in the FOV of the camera 301 since they are not of interest for occupancy determination in the embodiment discussed here. In some embodiments, the camera 301 is arranged in a height which allows to observe a parking spot of interest although a vehicle is parked between the camera 301 and the parking spot to be observed. In FIG. 1, this would be of particular interest for parking spots 1-4 since parking spots 5-8 are located between them and the camera 301.

The concrete arrangement of the camera 301 including its optical system which defines the geometry of the FOV is selected based on the parking area's 100 design, including the number, dimension, and location of parking spots of interest 1-8. The arrangement in FIG. 1 is again only exemplary and it is possible that the camera 301 is integrated in one of the charging stations 201-208. However, this is only advisable in case such arrangement still allows for sufficient observation of all parking spots of interest 1-8 of the parking area 100.

The parking area control system 300 processes data of the camera 301 to provide information about a status S1-S8 for each one of the parking spots of interest 1-8. Therein, each status S1-S8 would at least include an information about the occupancy of the respective parking spot 1-8, i.e. information about whether the respective parking spot 1-8 is occupied or not, i.e. whether a vehicle or something else with corresponding dimensions is positioned there or not. In that minimum scenario, the data processing of the parking area control system 300 corresponds to an occupancy determination of the parking spots of interest 1-8, the result of which essentially includes which parking spot of interest is occupied and which one is free. An even further reduced output of the occupancy determination might be the pure information whether any one of the parking spots of interest 1-8 is free.

Subsequently, the parking area control system 300 provides the result of the occupancy determination to be displayed by a mobile charging app which is provided by an operator of the parking area 100 and/or of the charging system 200. The app can be used by a user of an electric vehicle. It shows at least the result of the occupancy determination as processed by the parking area control system 300 so that the user can easily assess whether at least one of the parking spots of interest 1-8 is currently available in the parking area 100.

Possibly, the charging process itself or other processes like booking or reserving a parking spot etc. can also be controlled by the mobile app, but these options are not addressed in this invention. In some embodiments, the methods focus on the determination of the occupancies of the parking spots of interest 1-8. The occupancy determination, implemented in an occupancy determination method ODM, is based on a machine learning process, e.g., an unsupervised learning method.

Figure 2:
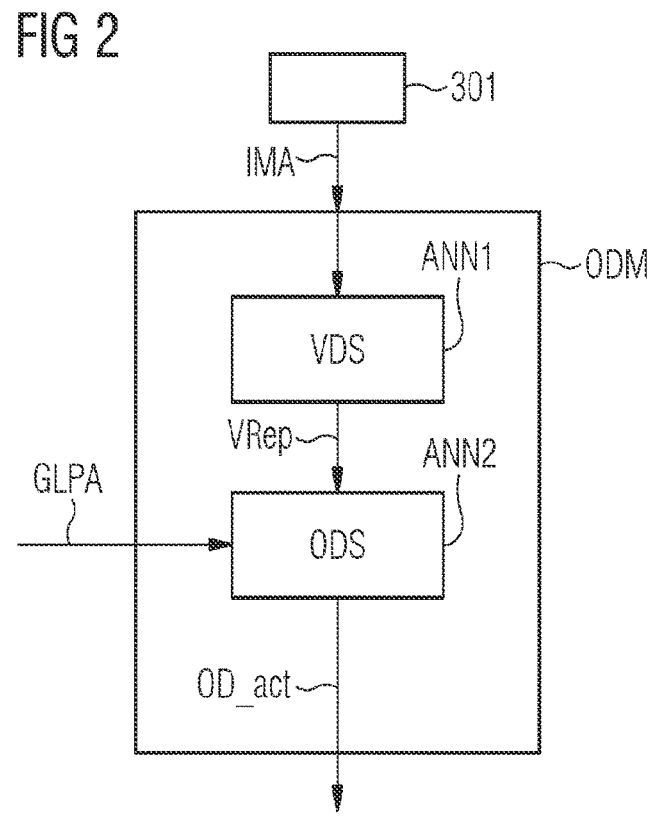
FIG. 2 shows a flow chart of the occupancy determination method incorporating teachings of the present disclosure.

The occupancy determination method ODM depicted in FIG. 2 utilizes images IMA from the camera 301. Such images IMA are produced by the camera 301 at a regular rate, for example ten images per minute, and show the section of the parking area 100 covered by the FOV of the camera 301. Each produced image IMA is provided to be processed by the occupancy determination method ODM. The method ODM and its various steps as described below is actually a computer implemented method executed by a processor 302 of the parking area control system 300.

In the method ODM, an image IMA produced by the camera 301 is processed to determine from that provided image IMA whether one or more objects of interest, in the following one or more vehicles, are positioned on correspondingly one or more of the parking spots of interest 1-8 and which one or more of the parking spots of interest 1-8 are occupied by the detected one or more vehicles. Thus, the result of executing the method ODM is an actual occupancy distribution OD_act which will be explained in detail below.

A first aspect of the method ODM concerns the detection of vehicles in the provided image IMA in a vehicle detection step VDS, i.e. the detection whether one or even more vehicles are present in the provided image IMA. Such detection can be achieved by a first module ANN1, e.g. a first trained artificial neural network ANN1 (in the following "first network ANN1"). The first network ANN1 can be based on a known deep learning (DL) model for detection of vehicles in an image IMA. Such state of the art DL models of supervised learning-based object detection and image segmentation methods are able to detect multiple kinds of objects in an image with high accuracy, even when the objects are partially occluded. For example, convolutional neural networks are common model architectures for such tasks, e.g. "ResNet", "MobileNet", or "Inception".

Figure 3:
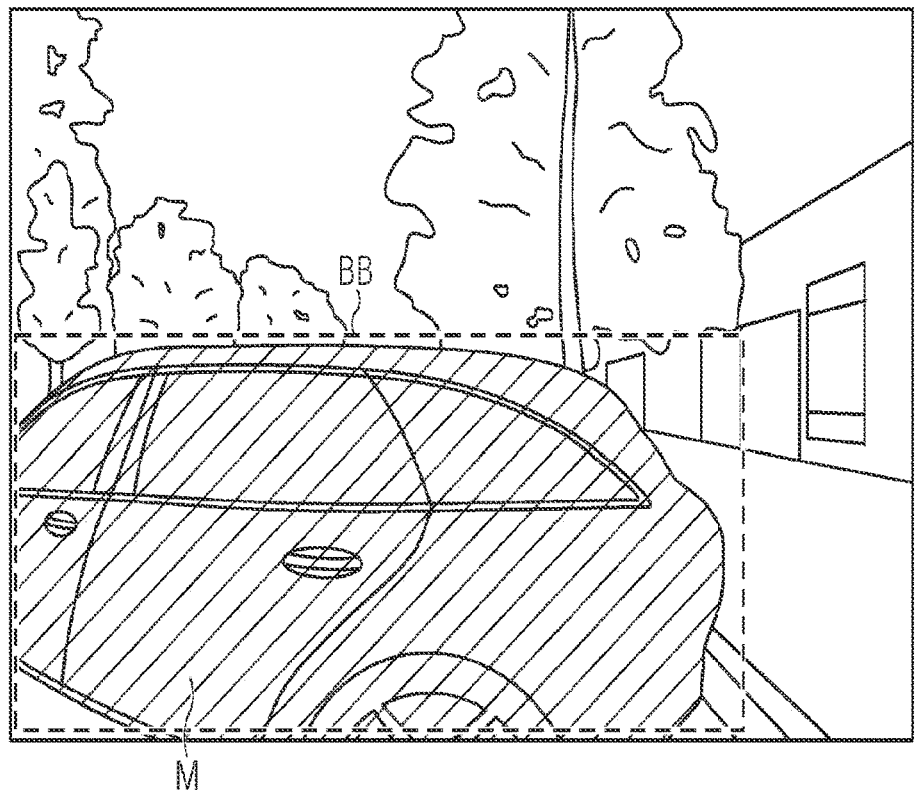
FIG. 3 shows an exemplary image IMA with a bounding box and a mask incorporating teachings of the present disclosure.

The DL model and the first network ANN1, respectively, can produce bounding boxes BB_i and/or pixel masks M_i with $i=1, 2, \ldots V$ for vehicles i found in the provided image IMA, wherein V represents the number of vehicles in the image IMA, i.e. $V=0, 1, 2, \ldots$, depending on the situation. This is exemplarily shown in FIG. 3 for one vehicle, i.e. $V=1$. In some embodiments, the step VDS is performed for every new image IMA captured. Of course, the one or more bounding boxes BB_i can be virtually combined into one common bounding box arrangement BB so that the bounding box arrangement BB represents the entirety of bounding boxes BB_i found by the first network ANN1 in an image IMA. Correspondingly, the one or more pixel masks M_i can be virtually combined into one common mask M which represents the entirety of pixel masks M_i found by the first network ANN1 in the image IMA.

Thus, the output OUT_ANN1 of the first network ANN1 as a result of the vehicle detection step VDS and of feeding the provided image IMA of the camera 301 as an input IN ANN1 to the first network ANN1 would be a number N of bounding boxes BB_1, BB_2, . . . , BB_N depending on the number N=V of detected vehicles as well as on their dimensions and types, e.g. combined into a common bounding box arrangement BB=[BB_1, BB_2, . . . , BB_N], and/or a number N of pixel masks M_1, M_2, . . . , M_N, e.g. combined into a common mask M. Thus, the mask M combines the one or more masks M_i, each depending on the one or more detected vehicles' shapes and types, wherein each mask M, M_i indicates those pixels of the provided image IMA which have been detected to represent a part of a vehicle. Still, the number N corresponds to the number of detected vehicles N=V in the provided image IMA. Thus, OUT_ANN1={BB;M} or OUT_ANN1={BB} or OUT_ANN1={M} with i=1, . . . , N, as the case may be.

In the following and for the sake of brevity, such data M_i and/or BB_i and/or M and/or BB, as the case may be, are represented by a general term "vehicle representation" VRep. In the end, each one of the introduced outcomes BB_i, BB, M_i, M of the vehicle detection step VDS is a representation of the actual situation on the parking area w.r.t. vehicles being parked there. Consequently, the same is applicable for the newly introduced term vehicle representation VRep. Thus, the output and result, respectively, of the vehicle detection step VDS being applied on an image IMA is the vehicle representation VRep according to that image IMA.

As a summary, a vehicle representation VRep is produced in the vehicle detection step VDS for each individual image IMA. Such results VRep as well as the respective images IMA themselves can be stored on a memory 303 of the camera 301 or of the control system 300 for a predetermined period, e.g. a week.

The data VRep are used in further processing steps to perform essentially two activities, namely the actual occupancy determination to determine OD_act in an occupancy determination step ODS as well as spot clustering to determine a general layout GLPA of the parking area 100.

The layout GLPA of the parking area 100 comprising the parking spots of interest 1-8, being represented by a mask REP_PS, is utilized as an input of the second module ANN2 besides the actual vehicle representation VRep to determine the actual occupation OD_act. While the actual vehicle representation VRep is derived from an actual, newly captured image IMA, such layout GLPA of the parking area 100 is determined in the spot clustering step SCS based on a plurality of images IMA captured over time, therewith utilizing the history of previous parking events, represented by the plurality of images IMA captured over time. More concretely, the spot clustering step SCS utilizes the individual vehicle representations VRep produced by ANN1 and, for example, stored in memory 303. That means, out of the resulting hundreds or thousands of vehicle representations VRep, most or all of which are unique since not all vehicles are exactly the same size or park exactly in the same form, a number of parking spots is derived, for example eight for the parking area 100 of FIG. 1, by means of a clustering approach. The output of this clustering approach can be a set of parking spot representations or masks REP_PS_j with j=1, 2, . . . , NPS with NPS representing the number of parking spots of interest. In case VRep is embodied as a mask as described above, REP_PS_j would also be embodied as masks. However, in case VRep is embodied as bounding box arrangement, REP_PS_j would also have the form of bounding boxes.

Just for the sake of clarity, it should be mentioned that REP_PS_j and REP_PS, respectively, in case they are embodied as masks are different from the earlier introduced individual masks M_i or M, respectively. While M_i and M result from a single image IMA, REP_PS_j are more general masks resulting from an evaluation of a plurality of images IMA, representing the areas where vehicles are expected to be located for a given parking area, but not the vehicles themselves. Therefore, REP_PS_j are expected to be wider than the individual masks M_i as some vehicles may park more to the left or more to the right of the same parking spot, or a bigger vehicle may park, etc. Also, the individual image masks M_i are basically binary since they say for each pixel of the image IMA whether a vehicle was detected in it or not, while the parking spot masks REP_PS_j and REP_PS can be probabilistic. As they are computed from multiple images IMA and corresponding representations VRep, a probabilistic value can be assigned to each pixel, for example the probability that a given pixel will be occupied by a vehicle parked in spot X.

The one or more individual representations REP_PS_j can be virtually combined into one common parking spot representation REP_PS which represents the entirety of parking spot representations REP_PS_j. Both the entirety of representations REP_PS_j and the resulting combined representation REP_PS represent the general layout GLPA of the parking area 100 comprising the parking spots of interest 1-8. Therefore, in the following and for the sake of brevity, such data REP_PS_j and REP_PS, as the case may be, shall be represented and replaced by the general term "general layout of the parking area" GLPA. In the end, each one of the introduced outcomes REP_PS_j, REP_PS of the spot clustering step SCS is a representation of the layout of the parking area 100. Consequently, the same is applicable for the newly introduced term GLPA. Thus, the output and result, respectively, of the spot clustering step SCS being applied based on the plurality of VRep is the general layout GLPA of the parking area 100.

As a summary, a plurality of vehicle representations VRep produced over time is processed in the spot clustering step SCS to provide the parking spot representations REP_PS_j and the layout GLPA, respectively. The spot clustering can be based on an hierarchical clustering process and apply an unsupervised machine learning approach. In some embodiments, the spot clustering step SCS is performed periodically, e.g. daily, but not necessarily after every image IMA. Moreover, the spot clustering step SCS does not necessarily make use of all images IMA and representations VRep, respectively, but only a subset is used, e.g. every tenth image IMA and representation VRep. Each time, the data base utilized for clustering is more comprehensive so that the system improves its performance and reliability over time and with every additional execution of the spot clustering.

In other words and in more detail, the spot clustering uses the plurality of outputs OUT_ANN1(c)=VRep(c) of the first network ANN1 which are stored in memory 303 as an input IN_CLUST. As mentioned above, the first network ANN1 produces an output OUT_ANN1(c)=VRep(c) for each image IMA(c) with c=1, 2, . . . captured by the camera 301, i.e. "c" is an index which stands for different images IMA(c) captured by the camera 301, i.e. "c" counts the captured images IMA.

The spot clustering SCS applies an unsupervised learning method such as hierarchical clustering, either agglomerative or divisive, to group VRep(c), i.e. the bounding boxes BB(c) and/or pixel masks M(c), respectively, generated by the first network ANN1 for a plurality of images IMA(c) to determine the spots where vehicles are usually parked in the current visual field FOV of the camera 301. This approach assumes that vehicles are at least most times correctly parked in the parking area 100, i.e. essentially on the available parking spots 1-8, but not at positions between two parking spots or similar. In practice, it is indeed sufficient when vehicles are parked correctly only most of the times but not necessarily always since a small number of outliers, e.g. vehicles parked between parking spots, would have negligible impact on the parking spot detection. Thus, a timely extended observation of the parking area 100 by analyzing a corresponding plurality of images IMA(c) and the output OUT_ANN1 of the first network ANN1, respectively, allows to reconstruct the parking spots 1-8 of the parking area 100 or, more precisely, allows to reconstruct the areas A1-A8 representing the parking spots 1-8 of the parking area 100 in the images. For example, in case the masks M(c) of different images IMA(c) repeatedly include pixels according to a vehicle in a certain area of the image, such repetition or "clustering" can be interpreted such that that area Aj of the images must correspond to a parking spot j of the parking area 100. In the same way, in case the bounding boxes BB(c) of different images IMA(c) repeatedly include a box according to a vehicle in a certain area of the image, such repetition and clustering, respectively, can be interpreted such that that area Aj of the images must correspond to a parking spot j of the parking area 100.

Thus, a combination or overlaying of a plurality of masks M(c) results in a mask heatmap REP_PS with first sections corresponding to areas where vehicles have been parked over time and second sections corresponding to areas where essentially no vehicles have been parked. Thus, the heatmap REP_PS shows the areas A1-A8 representing the parking spots 1-8 of the parking area 100 in the images IMA. In the same way, overlaying of the bounding box arrangements BB(c) results in a bounding box heatmap REP_PS which shows the areas A1-A8 representing the parking spots 1-8 of the parking area 100 in the images IMA. Thus, any one of the created heatmaps REP_PS provides information about the positions of the representations of the parking spots 1-8 in an image IMA and, consequently, about the number of parking spots 1-8. The quality of this information improves over time due to the increasing number of processed vehicle representations VRep. This results in the ability of the system for automatic configuration or adaption of the system 300 to a particular parking area 100. I.e. in the spot clustering step SCS, the system 300 automatically recognizes the layout GLPA of the parking area 100 after a sufficient number of images IMA has been captured.

Thus, at this point both an actual vehicle representation VRep from an actual image IMA as well as the general layout of the parking area GLPA based on evaluating a plurality of such vehicle representations VRep(c) is available.

A second aspect of the method ODM is realized by a second module ANN2 and concerns the determination of an actual occupancy distribution OD_act in an occupancy determination step ODS based on the actual information OUT_ANN1=VRep and, moreover, utilizing the general layout of the parking area GLPA. OD_act describes which one or more of the parking spots 1-8 are currently occupied by the one or more vehicles determined in the vehicle detection step VDS, represented by VRep.

For example, the determination of the actual occupancy distribution OD_act can be achieved based on an embodiment of the second module ANN2 utilizing a second trained artificial neural network ANN2 (in the following "second network ANN2", as the case may be). In a less complex, but still accurate approach the determination of the actual occupancy distribution OD_act can be achieved by applying a probabilistic model PBM or, as a further alternative, by a linear model in the second module ANN2.

In the exemplary first embodiment of the second module ANN2 applied here, the occupancy determination is achieved based on such probabilistic model PBM.

During regular operation and based on an actual, newly captured image IMA, the method ODM will figure out the current state of the parking spots 1-8 in the occupancy determination step ODS, using the actual vehicle representation VRep calculated from the actual image IMA in the vehicle detection step VDS as well as the general layout GLPA of the parking area 100. The layout GLPA comprises the parking spots of interest 1-8 and is represented by the representation REP_PS as mentioned above and generated in the spot clustering step SCS. The occupancy determination step ODS does not use the entire history of the plurality of vehicle representations VRep(c) produced over time, but only the vehicle representation VRep from the latest image IMA.

Additionally, a change mask M_subb produced by a background subtraction model as described below might be utilized optionally in the occupancy determination step ODS. Such change mask M_subb basically indicates which pixels of the image IMA currently contain a vehicle while the parking spot masks REP_PS indicate which pixels of the image correspond to which parking spot 1-8, and with which probability.

Based on an input IN ANN2 with IN ANN2 comprising at least the actual vehicle representation VRep and the general layout of the parking area 100 GLPA, the second module ANN2 produces in the occupancy determination step ODS as an output OUT_ANN2 an actual occupancy distribution OD_act=[o1, o2, . . . , oJ] for the parking spots of interest 1-8 of the parking area 100. For example, an occupancy distribution OD might have the format of a vector with entries oj with j=1, . . . , J wherein J represents the number of parking spots of interest, i.e. J=8 in the shown embodiment of the parking area 100. Each entry oj of the vector OD is assigned to one particular parking spot of interest j and expresses whether the parking spot j corresponding to that entry oj is currently occupied or free. An entry oj=1 might mean that the corresponding parking spot j is occupied, and an entry oj=0 would in that case mean that the corresponding parking spot j is free. Just as an example, a distribution OD=[1,1,0,1,0,0,1,1], i.e. o1=o2=o4=o7=o8=1 and o3=o5=o6=0, expresses that parking spots 1, 2, 4, 7, 8 are currently occupied and parking spots 3, 6 are free.

In a first variant of the working principle of the probabilistic model PBM applied by ANN2 in the occupancy determination step ODS to determine the current occupancy distribution OD_act, different possible combinations of occupancies of parking spots of interest are considered, i.e. different occupancy distributions OD(k) with k=1, . . . , 2^J. Each parking spot, as known from and according to the general layout GLPA of the parking area 100 as determined in the spot clustering step SCS, has an occupancy status of being either occupied or free. With J=8 parking spots being available and each parking spot being in one out of two of those occupancy statuses, $2^J$ combinations of occupancies of parking spots of interest are possible, e.g. the extreme situations with all parking spots occupied OD(k=1)=[1,1,1,1,1,1,1,1] or free OD(k=$2^J$)=[0,0,0,0,0,0,0,0] and situations with some parking spots occupied and some parking spots being free like OD(k1)=[0,1,0,1,0,1,0,1] and OD(k2)=[1,0,0,0,0,1,0,1] etc. with k1≠k2 and 1<k1,k2<$2^J$.

The probabilistic model's PBM working principle in the first variant is such that the model PBM processes the actual vehicle representation VRep provided by the first module ANN1 and optionally the mask M_subb of the background subtraction model, to provide a likelihood P_tot(k) for each one k=1, . . . , $2^J$ of the $2^J$ possible occupancy distributions OD(k). Therein, such likelihood P_tot(k) expresses to which extent the respective occupancy distribution OD(k) corresponds to or matches with the input VRep. This is based on the information about the parking area layout represented by GLPA as provided in the spot clustering step SCS. In other words, the general layout GLPA provides information about the number and the position of parking spots so that all possible combinations of occupancies can be derived from the layout GPLA. As a consequence, different combinations of possible occupancies and different occupancy distributions OD(k), respectively, are assigned different likelihoods P_tot(k) by the model PBM so that one specific combination k' of occupancies and, therewith, one occupancy distribution OD(k') receives the highest likelihood P_tot(k') to be matching with the actual vehicle representation VRep. That particular occupancy distribution OD(k') with highest likelihood P_tot(k') is then assumed to represent the current occupancy situation on the parking area 100, i.e. OD_act=OD(M).

Just for example, the processing of the actual vehicle representation VRep in the second module ANN2 by the model PBM in the first variant might result in a likelihood of P_tot(k1)=10% for a first combination k1 of occupancies OD(k1)=[0,1,0,1,0,1,0,1], in a likelihood of P_tot(k2)=5% for a second combination of occupancies OD(k2)=[1,0,0,0,0,1,0,1], and in a likelihood of P_tot(k3)=60% for a third combination of occupancies OD(k3)=[1,1,0,1,0,0,1,1]. For the sake of brevity, further occupancies OD(k4), OD(k5) etc. and corresponding likelihoods are not considered so that the sum of the given likelihoods is below 100%. As mentioned above, the number of possible combinations of occupancies is with $2^J$ significantly higher than those three combinations. However, it is sufficient to utilize only those three exemplary combinations k1, k2, k3 for the explanation of the approach applied by the model PBM in the first variant.

According to the calculated likelihoods P_tot(k1), P_tot(k2), P_tot(k3), . . . with P_tot(k3) being the highest likelihood of 60% in the chosen example, representing a combination of occupancies OD(k3)=[1,1,0,1,0,0,1,1], the output OUT_ANN2 of the second network ANN2 would be that parking spots 1, 2, 4, 7, 8 are currently occupied and parking spots 3, 5, 6 are free, i.e. OUT_ANN2=OD_act=OD(k3). As an alternative, the probabilities of each combination can be combined into individual probabilities for each spot.

In some embodiments, an occupation likelihood P_j with j=1, . . . , J (J=8) is calculated in a first step for each individual parking spot of interest 1-8. Again, the individual parking spots can be assumed to be known from the earlier determined general layout GLPA of the parking area 100. In other words, a probabilistic estimation is conducted for each parking spot of interest 1-8, such estimation resulting in likelihoods P_j that such respective parking spot of interest j is occupied by a vehicle. In contrast to this, the first variant calculates the likelihood that a complete occupancy distribution OD(k) matches with the input VRep received from the first network ANN1.

Thus, in the second variant the output OUT_ANN2 of the second network ANN2 and of the model PBM after having received the input VRep would be the likelihoods P_1-P_8. Such a likelihood P_j with j=1, . . . , 8 represents the probability that the respective parking spot of interest j is currently occupied by a vehicle or an object of interest, respectively. Thus, OUT_ANN2=OD_act=[P_1, . . . , P_J].

The likelihoods P_j might be expressed as percentage values. Individual results P_j of the model PBM will typically not be exactly 0% or 100%, but results will reside between those extreme values. Thus, in case those values P_j would be provided to the users of the mobile app, such user might be unclear about whether a parking spot of interest is free or not, for example in case P_j=55%. Therefore, the parking area control system 300 which executes the method ODM further processes the likelihoods P_1-P_8 such that binary values Pb_1-Pb_8 result, giving clear statements whether a particular parking spot of interest is occupied, Pb_j=1, or not, Pb_j=0, instead of the relatively unclear likelihoods P_j between 0% and 100% as described above. For example, this final step might make use of a threshold T wherein a value "0" or "free" could be chosen for Pb_j in case P_j is below the threshold T and a value "1" or "occupied" could be chosen for Pb_j in case P_j is equal to or above the threshold T. Alternatively, two thresholds T1, T2 could be defined with T2>T1 and a value "0" or "free" could be chosen for Pb_j in case P_j is below the threshold T1 and a value "1" or "occupied" could be chosen for Pb_j in case P_j is above the threshold T2. In case P_j is between T1 and T2, "unknown" or some similar expression might be chosen for Pb_j. Still just for example, T1 might be chosen to be 10% and T2 might be chosen to be 90%. In case such further processing of the likelihoods P_j is indeed conducted, the occupancy distribution OD_act would be OD_act=[Pb_1, . . . , Pb_J].

Both the first and the second variant explained above, each representing working principles of the model PBM to determine the current occupancy distribution OD_act, are suitable to determine the occupancy distribution OD_act. Thus, the first variant actually computes a so-called joint probability mass function, which is the likelihood of each possible combination, and the second variant directly computes the so-called marginal distributions. In the end, the aspired result would be the probability of being occupied or free, respectively, for each parking spot individually, i.e. the marginal distributions. However, such marginal distributions can be derived from the result of the first variant, for example by utilizing the method of marginalization which generates individual spot probabilities from the joint distribution. This can be done by summing for each individual parking spot known from the spot clustering step SCS the probabilities P_tot of all the combinations where the spot is free as well as those where it is occupied, and normalizing them.

For the sake of completeness, in some cases there are methods to compute directly the marginal probabilities without first computing the entire joint distribution, which can be more computationally efficient, especially if a large number of spots has to be considered but for number considered here it would not make a significant difference.

After all, the first and the second variant apply different implementations of a probabilistic model PBM in the occupancy determination step ODS to process the input VRep and GLPA in the second module ANN2. However, both approaches result in an actual occupancy distribution OD_act, including information about occupancy of each parking spot of interest 1-8. This information OD_act can be utilized in the mobile app or, for example, on a web platform or similar means to inform a user looking for a parking spot.

Projections of the real parking volumes, which are volumes extending in vertical direction from the essentially two-dimensional parking spots 1-8, are expected to overlap in the visual field FOV of the camera 301, as there can be parking volumes in the foreground and background from the camera's 301 perspective. In addition to the clustering of bounding boxes BB(c) and/or masks M(c) which results in the heatmaps REP_PS and the identification of areas A1-A8 representing parking spots 1-8 in the images IMA, respectively, the possible combinations of parking spot utilization, i.e. the possible occupancy distributions OD(k), can be observed after a sufficiently long observation time and a sufficient number of analyzed images IMA, respectively. However, even the knowledge of parking spots 1-8 alone which directly results from the above heatmap determination enables the determination of possible occupancy distributions OD(k).

Thus, based on such unsupervised learning, the probabilistic model PBM and the second module ANN2, respectively, can provide an actual occupancy distribution OD_act after having received an actual vehicle representation VRep. However, the probabilistic model PBM as applied in the first embodiment of the second module ANN2 is useful when different masks are combined, e.g. VRep coming from the vehicle detection step VDS and M_subb coming from the background subtraction step BS. Joining such masks VRep, M_subb provides information about which sets of pixels belong to a vehicle or an unexpected object not belonging to the background, and it can be computed which is the most likely combination of spot occupancy that would result in this observation to finally produce individual spot occupancy probabilities P_j and Pb_j, respectively, as described above.

In an exemplary second embodiment of the second module ANN2, a non-probabilistic model nPBM is used in the second module ANN2 such as a linear regression model, a support vector machine (SVM) or even a neural network. In this case, the working principle of the second module ANN2 would be such that the model nPBM maps actual bounding boxes BB_i or masks M_i to one of the known spots REP_PS_j coming from the spot clustering. With that, the bounding boxes BB_i or masks M_i are directly fed to a machine learning model which returns to which of the known parking spots REP_PS_j it belongs or, optionally, such probability for each of the known parking spots. This can be used to directly determine the occupancy OD_act.

Such a mapping model nPBM can be trained directly after clustering in the spot clustering step SCS has concluded in the following way:

In a first step, clustering as descried above is executed based on the history of bounding boxes BB_i or masks M_i, which produces for each bounding box BB_i or mask M_i in the database an assignment ASSIGN_i indicating which parking spot REP_PS_j it is assigned to.

In a second step, the original bounding boxes BB_i or masks M_i and the assignments ASSIGN_i are used as examples to train the machine learning model nPBM that produces output assignments ASSIGN based on arbitrary input bounding boxes BB or masks M.

The trained model nPBM from the second step would be used from this moment on to assign bounding boxes from newly captured images to known parking spots REP_PS_j, without using any probabilistic model.

For the sake of clarity, it might be mentioned that the second step in the second embodiment of the second module ANN2 is not utilized in the first embodiment of the second module ANN2 described above. Instead, the first embodiment of the second module ANN2 uses the assignments produced in the first step together with the individual masks to produce the spot-specific masks and heatmaps, respectively, containing the individual pixel probabilities.

Figure 4:
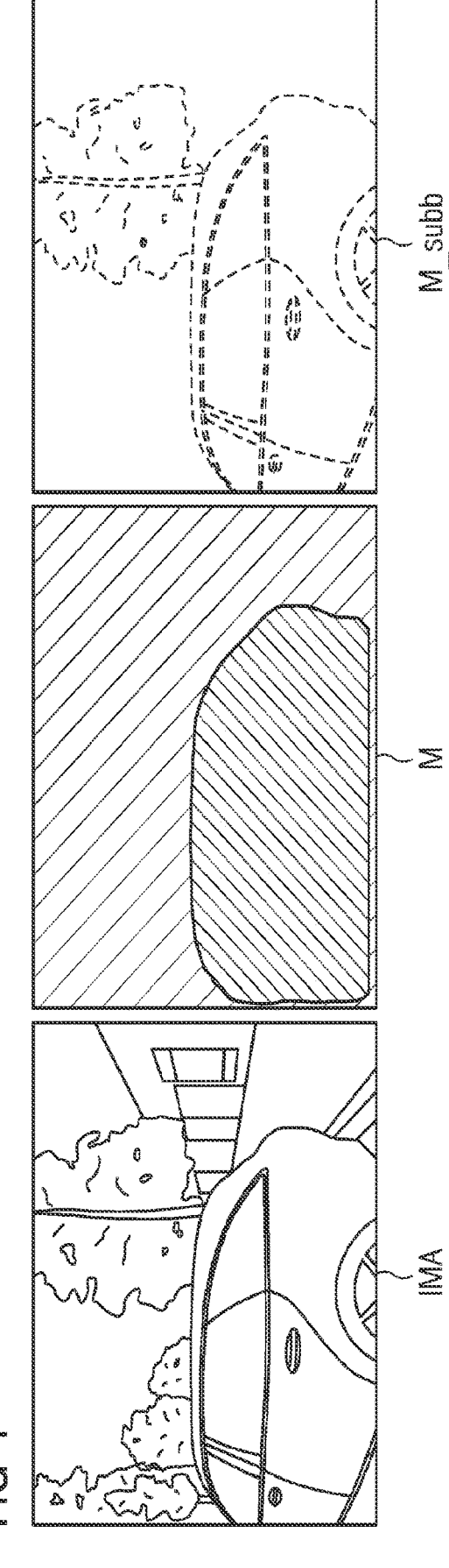
FIG. 4 shows the exemplary image IMA as well as a corresponding common mask M and a corresponding subtraction mask M_subb.

Another beneficial, but still only optional contribution to the determination of the actual occupancy distribution OD_act in the occupancy determination step ODS would be the utilization of an additional mask M_subb resulting from a background subtraction step BS. In the step BS, a difference image between the actual image IMA and a background image IMA_B is calculated, wherein the background image IMA_B shows the FOV with free parking spots 1-8. This optional step BS is used to find objects in the foreground in the current image IMA taken by the camera 301, producing the mask M_subb containing in the ideal case only changed pixels where foreground objects are found. In order to calculate the difference between the background image IMA_B and the current image IMA, their light level and color maps must be first aligned, which can be performed by conventional image processing methods, e.g. background/foreground segmentation based on mixture of gaussians, or by using unsupervised machine learning methods such as autoencoder neural networks. The generated mask M_subb complements the common mask M generated by the vehicle detection step VDS, as it offers the advantage of detecting arbitrary objects, even those not learned by the pretrained model. For the sake of clarity, FIG. 4 shows an actual image IMA, a corresponding common mask M, and a corresponding mask M_subb.

The mask M_subb can then be used by the second module ANN2 in addition to the input VRep and GLPA explained above, for example by overlaying the vehicle representation VRep and the additional mask M_subb such that VRep'=VRep+Msubb would be provided to the second module ANN2 for further processing as described above.

Figure 5:
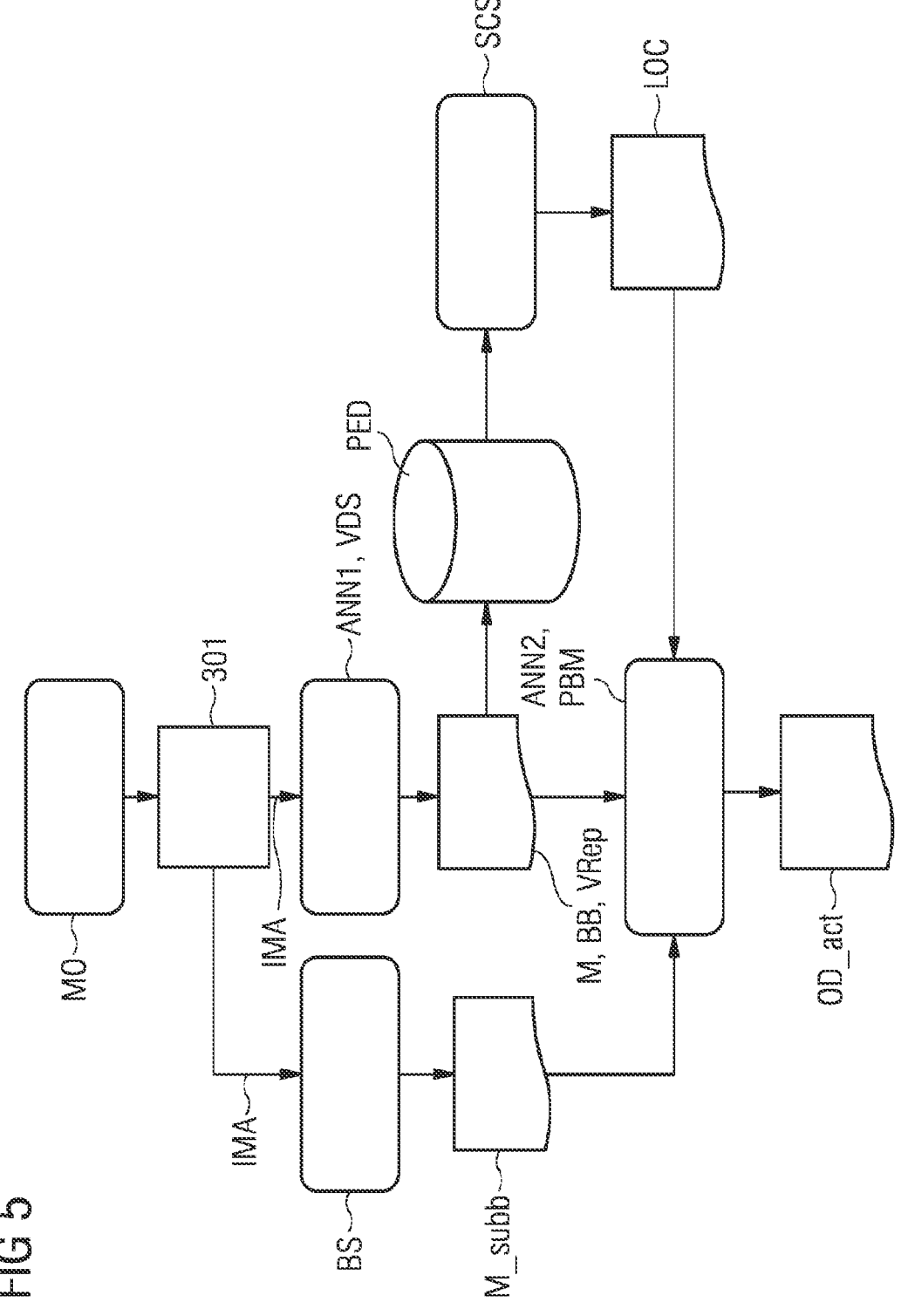
FIG. 5 shows another illustration of the occupancy determination.

As a summary, FIG. 5 shows another illustration of the occupancy determination explained above. It might be mentioned that the overall occupancy determination method ODM might apply a motion detection step MO as an optional starting point or trigger TRIG for initiating the execution of the method ODM, i.e. at least the vehicle detection step VDS and, consequently, the occupancy determination step ODS would only be executed after occurrence of the trigger signal TRIG. It can be assumed that changes in the utilization of any one of the parking spots 1-8 must be preceded by motion events in the parking area 100. In order to reduce the amount of image data to process and to produce a more balanced dataset with different occupancy patterns, the solution can first use a motion detection based trigger to capture images between significant motion events. Such motion sensing can be implemented via dedicated sensors 304 of the system 100, e.g. infrared sensors, integrated in the charging stations 201-208 or by applying a software-based motion sensing algorithm to the existing camera sensor feed, e.g. by observing changes at the pixel level on relevant regions of the actually captured image IMA.

In some embodiments, the motion based trigger MO activates the camera 301 to capture an image IMA as soon as a motion has been detected. The actual image IMA is, on the one hand, processed by the first module ANN1 for the purpose of vehicle detection, resulting in a common mask M and/or a bounding box arrangement BB, i.e. in a vehicle representation VRep, and on the other hand it is optionally processed in the background subtraction step BS to generate the additional mask M_subb. The vehicle representation VRep is evaluated in the second module ANN2, e.g. based on the probabilistic model PBM, optionally utilizing the additional mask M_subb. In addition to this, some vehicle representations VRep are fed to and stored in a parking event database PED which is utilized to determine in the spot clustering step SCS the general layout GLPA of the parking area 100 via the described clustering approach which results in spot locations REP_PS_j of the parking spots 1-8 of the parking area 100. These are applied by the second module ANN2, which in the end determines the actual occupancy distribution OD_act as descried above.

Still referring to the components of FIG. 5, the vehicle detection step VDS and the background subtraction step BS are in charge of analyzing a single image IMA captured from the camera 301. The vehicle detection step VDS can be based on a pretrained/supervised algorithm, and the background subtraction step BS can be trained potentially in an unsupervised manner. Actually, since the steps VDS, BS are complementary, either one out of those two steps BS, VDS or both at the same time can be used for processing the images IMA.

The spot clustering step SCS which enables monitoring and tracking of parking spots in the long term across many images IMA can also be an example of an application of unsupervised learning.

While the present teachings have been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description. Thus, the scope of the disclosure is not restricted to the above illustrated embodiments but variations can be derived by a person skilled in the art without deviation.

What is claimed is:

1. A method for determination of an actual occupancy distribution of parking spots of a parking area, the method comprising:

processing an actual image of the parking area to detect one or more vehicles in the actual image, resulting in an actual vehicle representation, wherein the actual image is generated by a camera integrated in a charging station; and processing the actual vehicle representation and an earlier generated general layout of the parking area to determine the actual occupancy distribution using a probabilistic model to determine the current occupancy distribution based on a comparison of the actual vehicle representation with all possible occupancy distributions of the parking area according to the general layout of the parking area, wherein the general layout is generated based on prior actual images of the area taken by the camera;

wherein the model processes the actual vehicle representation to calculate a likelihood for each one of the possible occupancy distributions OD(k) with k=1, . . . , $2^J$ and J being the number of parking spots of the parking area, a respective likelihood expressing to which extent the respective occupancy distribution matches with the actual vehicle distribution; or the model determines the current occupancy distribution using a calculation of an occupation likelihood P_j for each individual parking spot of interest according to the general layout the parking area, with j=1, . . . , J and with J representing the number of parking spots according to the general layout, a probabilistic estimation based on the actual vehicle representation and the general layout is conducted for each such parking spot of interest, such estimation resulting in likelihoods P_j that such respective parking spot of interest j is occupied by a vehicle, and the actual occupancy distribution is represented by the likelihoods P_1, . . . , P_J.

2. The method according to claim 1, wherein the occupancy distribution OD(k') with the highest likelihood is selected to be the actual occupancy distribution OD_act=OD (k').

3. The method according to claim 1, further comprising determining the general layout of the parking area by processing a plurality of earlier vehicle representations VRep(c) with c=1, 2, . . . , which have been determined in the past to generate the general layout of the parking area.

4. The method according to claim 3, further comprising applying a hierarchical clustering process on the plurality of earlier vehicle representations.

5. The method according to claim 3, further comprising determining the general layout of the parking area by combining the plurality of earlier vehicle representations to produce a heatmap representing the general layout of the parking area, such that the heatmap comprises first sections representing areas of the parking area where vehicles have been parked in at least some of the captured images and second sections corresponding to areas where no or only rarely vehicles have been parked, wherein the first sections allow for a conclusion on the number and position of parking spots in the parking area.

6. The method according to claim 5, wherein determining all possible occupancy distributions is based on the identification of the first sections of the heatmap.

7. The method according to claim 1, wherein a change mask produced in a background subtraction step applied with the image is utilized in the occupancy determination step, wherein corresponds to a difference image between the actual image and a background image, wherein the background image shows the parking area with free parking spots, wherein the occupancy determination step processes a combination of the actual vehicle representation and the change mask.

8. A system for determining an actual occupancy distribution of one or more parking spots of a parking area, the system comprising a camera with a field of view for capturing images of the parking area, the images comprising representations of the parking spots;

a processor configured to:

process an actual image of the parking area to detect one or more vehicles in the actual image, resulting in an actual vehicle representation; and process the actual vehicle representation and an earlier generated general layout of the parking area to determine the actual occupancy distribution, wherein the general layout is generated based on prior actual images of the area taken by the camera; and a memory;

wherein the camera captures a plurality of images over time;

the processor is further configured to determine an actual vehicle representation for each image of the plurality of images, wherein the vehicle representations are stored in the memory; and the processor is further configured to process at least a subset of the determined vehicle representations stored in the memory in a spot clustering step to determine the general layout of the parking area and use a probabilistic model to determine the current occupancy distribution based on a comparison of the actual vehicle representation with all possible occupancy distributions of the parking area according to the general layout of the parking area;

wherein the model processes the actual vehicle representation to calculate a likelihood for each one of the possible occupancy distributions OD(k) with k=1, . . . , $2^J$ and J being the number of parking spots of the parking area, a respective likelihood expressing to which extent the respective occupancy distribution matches with the actual vehicle distribution; or the model determines the current occupancy distribution using a calculation of an occupation likelihood $P\_j$ for each individual parking spot of interest according to the general layout the parking area, with j=1, . . . , J and with J representing the number of parking spots according to the general layout, a probabilistic estimation based on the actual vehicle representation and the general layout is conducted for each such parking spot of interest, such estimation resulting in likelihoods $P\_j$ that such respective parking spot of interest j is occupied by a vehicle, and the actual occupancy distribution is represented by the likelihoods $P\_1$, . . . , $P\_J$.

9. The system according to claim 8, wherein the processor is configured to determine an updated general layout of the parking area after a given number of images has been captured.

10. The system according to claim 8, further comprising a motion sensor detecting motion in the field of view of the camera;

wherein the system is configured such that the processor processes the actual vehicle representation and an earlier generated general layout of the parking area to determine the actual occupancy distribution only executed when the motion sensor detects a significant motion in the field of view.

11. A method for determining a general layout of a parking area comprising at least one parking spot, the method comprising:

providing a plurality of vehicle representations VRep(c) with c=1, 2, 3, . . . , wherein different vehicle representations VRep(c1), VRep(c2) with c1/c2 of the plurality of vehicle representations VRep(c) have been determined in corresponding vehicle detection steps from different images of the parking area taken by a camera integrated in a charging station, wherein such different images show the parking area at different points in time; and processing the vehicle representations in a spot clustering step to determine the general layout of the parking area based on prior actual images of the area taken by the camera;

wherein the spot clustering applies a hierarchical clustering process on the plurality of vehicle representations;

processing at least a subset of the determined vehicle representations to determine the general layout of the parking area and use a probabilistic model to determine the current occupancy distribution based on a comparison of the actual vehicle representation with all possible occupancy distributions of the parking area according to the general layout of the parking area;

wherein the model processes the actual vehicle representation to calculate a likelihood for each one of the possible occupancy distributions OD(k) with k=1, . . . , $2^J$ and J being the number of parking spots of the parking area, a respective likelihood expressing to which extent the respective occupancy distribution matches with the actual vehicle distribution; or the model determines the current occupancy distribution using a calculation of an occupation likelihood $P\_j$ for each individual parking spot of interest according to the general layout the parking area, with j=1, . . . , J and with J representing the number of parking spots according to the general layout, a probabilistic estimation based on the actual vehicle representation and the general layout is conducted for each such parking spot of interest, such estimation resulting in likelihoods $P\_j$ that such respective parking spot of interest j is occupied by a vehicle, and the actual occupancy distribution is represented by the likelihoods $P\_1$, . . . , $P\_J$.

* * * * *